United States Patent
Watkins et al.

(10) Patent No.: US 7,321,970 B2
(45) Date of Patent: Jan. 22, 2008

(54) METHOD AND SYSTEM FOR AUTHENTICATION USING INFRASTRUCTURELESS CERTIFICATES

(75) Inventors: Craig R. Watkins, State College, PA (US); Jeremey Barrett, Sugar Land, TX (US); Adam Cain, Madison, WI (US)

(73) Assignee: Nokia Siemens Networks Oy, Espoo (FI)

( * ) Notice: Subject to any disclaimer, the term of this patent is extended or adjusted under 35 U.S.C. 154(b) by 541 days.

(21) Appl. No.: 10/748,760

(22) Filed: Dec. 30, 2003

(65) Prior Publication Data
US 2005/0149723 A1 Jul. 7, 2005

(51) Int. Cl.
*H04L 9/32* (2006.01)
(52) U.S. Cl. .................. 713/156; 713/175
(58) Field of Classification Search ............. 726/10, 726/7, 6, 5, 4; 713/157, 158
See application file for complete search history.

(56) References Cited

U.S. PATENT DOCUMENTS

| | | | | |
|---|---|---|---|---|
| 5,903,882 | A * | 5/1999 | Asay et al. | 705/44 |
| 6,085,976 | A * | 7/2000 | Sehr | 235/384 |
| 6,145,079 | A * | 11/2000 | Mitty et al. | 713/170 |
| 6,829,584 | B2 * | 12/2004 | Loveland | 705/7 |
| 6,957,199 | B1 * | 10/2005 | Fisher | 705/78 |
| 7,069,234 | B1 * | 6/2006 | Cornelius et al. | 705/26 |
| 2003/0204729 | A1 * | 10/2003 | Rockwood et al. | 713/176 |

FOREIGN PATENT DOCUMENTS

| | | |
|---|---|---|
| KR | 2000-0024217 | 5/2000 |
| KR | 2003-0052194 | 6/2003 |
| WO | WO 01/09701 A1 * | 2/2001 |

OTHER PUBLICATIONS

T. Dierks Certicom, C. Allen Certicom, "The TLS Protocol," *Network Working Group*, Jan. 1999, pp. 1-75.
R. Housley (Spyrus), W. Ford (VeriSign), W. Polk (NIST), D. Solo (Citicorp), Internet X.509 Public Key Infrastructure, *Network Working Group*, Jan. 1999, pp. 1-58.

* cited by examiner

*Primary Examiner*—Matthew B Smithers
(74) *Attorney, Agent, or Firm*—Harrington & Smith, PC

(57) ABSTRACT

Methods and systems are directed to authenticating a client over a network. The client generates a certificate and sends it to a server through a trusted mechanism. The server is configured to store the received certificate. When the client requests authentication over the network, it provides the certificate again, along with a parameter associated with a secure session. The server verifies the parameter associated with the secure session and determines if the certificate is substantially the same as the stored certificate. The server authenticates the client over the network, if the certificate is determined to be stored. In another embodiment, the client transmits the certificate that is generated by a third party Certificate Authority (CA) based, in part, on the client's public key.

27 Claims, 6 Drawing Sheets

METHOD AND SYSTEM FOR AUTHENTICATION USING INFRASTRUCTURELESS CERTIFICATES

FIELD OF THE INVENTION

The present invention relates generally to computer security, and more particularly, to authenticating a client employing an infrastructureless certificate.

BACKGROUND OF THE INVENTION

With the need for more secure communications, different types of security systems and measures have evolved over time for networking systems. Early models of network security systems involving the use of private keys to encrypt and decrypt information exchanged over a network have been replaced with sophisticated and, at the same time, complicated secure session protocols. Many modern protocols involve certification of peer network devices, such as a client and a server, through a chain of trusted Certificate Authorities (CAs), and the like.

Secure Socket Layer/Transport Layer Security (SSL/TLS) protocols are commonly used secure communication protocols and include provisions for authenticating a client and optionally a server using digital certificates. During an SSL/TLS handshake, the client digitally signs a challenge issued by the server using a private key corresponding to a public key referenced in the client's certificate. The client also sends the server the client's public key certificate during the handshakes. Once the handshake is successfully completed, the client has proven that it possesses the private key corresponding to the public key in the client certificate. In other words, the client proves that it owns the certificate used in the client authentication portion of the SSL/TLS handshake.

Usually, a client and a server on the Internet authenticate each other using certificates that are not known or trusted a priori. This allows for "spontaneous" secure communications, where two parties that have never met or exchanged certificates may still establish trust in each other's certificates and perform authentication with these certificates. In order for this trust to be established, both participants are typically configured to belong to a Public Key Infrastructure (PKI). This means that both participants trusts one or more CAs that issue the certificate. When a server verifies a peer's certificate, the server may validate a chain of certificates linking the peer's certificate with the trusted CA. For each link in the certificate chain, the server may verify a digital signature and potentially check other requirements, such as validity date ranges, actual domain names, and the like, on the links between the certificates. Moreover, the server may also check whether or not each certificate in the chain has been revoked using Certificate Revocation Lists (CRLs), online certificate verification protocols, and the like.

Thus, the configuration and validation required to use certificates in a PKI can be exceedingly complex. Therefore, there is a need in the industry for an improved method and system for authenticating a client. Thus, it is with respect to these considerations, and others, that the present invention has been made.

SUMMARY OF THE INVENTION

In accordance with one aspect of the present invention, a method is directed to authenticating a client over a network. The method includes generating a first certificate and sending it to a server to be stored. The method further includes requesting a second certificate if authentication is desired, sending the second certificate, and comparing the first and the second certificates. The client is authenticated, if the first and the second certificates are substantially the same.

In accordance with another aspect of the present invention, a method is directed to authenticating a client over a network. The method includes receiving a certificate from a client over a trusted mechanism, storing it at the server, requesting another certificate if authentication is desired, and comparing the received and the stored certificates. The client is authenticated, if the received and the stored certificates are substantially the same.

In accordance with yet another aspect of the present invention, a method is directed to receiving authentication over a network. The method includes generating a certificate, sending the certificate to another network device to be stored, resending the certificate to the other network device, and receiving authentication, if the stored certificate and the resent certificate are substantially the same.

In accordance with a further aspect of the present invention, an apparatus is directed to authenticating a client over a network. The apparatus comprises a first component that receives a first and a second certificate, a second component that determines if the first and the second certificates are substantially the same, and authenticates the client if the first and the second certificates are substantially the same.

In accordance with a yet further aspect of the present invention, an apparatus is directed to receiving authentication over a network. The apparatus comprises a first component that generates a certificate, a second component that sends the certificate to a server to be stored, and a third component that resends the certificate to the server and receives authentication if the stored certificate and the resent certificate are substantially the same.

In accordance with another aspect of the present invention, a system is directed to authenticating a client. The system includes a client and a server. The client is arranged to generate a first certificate, send the first certificate to the server to be stored, and send the second certificate to the server, if authentication is requested. The server is arranged to store the first certificate if it is received for the first time, compare the first certificate and the second certificate, and authenticate the client, if the first certificate and the second certificate are substantially the same.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

Figure 1:
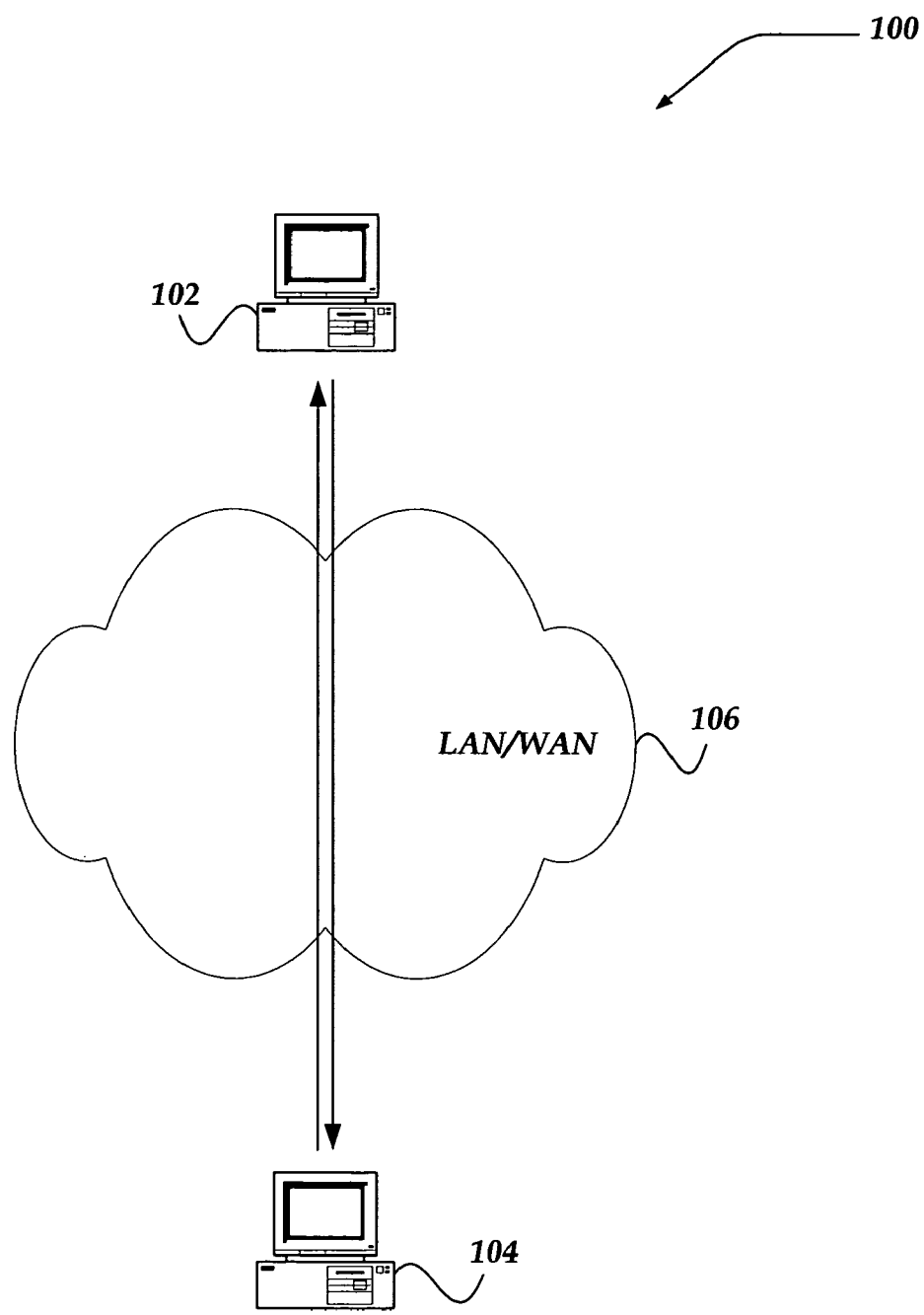
FIG. 1 illustrates one embodiment of a network system in which the present invention may be practiced.

The present invention is directed to addressing the above-mentioned shortcomings, disadvantages and problems, and will be understood by reading and studying the following specification.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," include an open-ended or inclusive transitional construct and does not exclude additional, unrecited elements, or method steps. For example, a combination that comprises A and B elements, also reads on a combination of A, B, and C elements.

The terms "client" and "server" include any network device in communication with each other and should not be understood limiting to one particular embodiment. For example, a networked computer, a gateway, an ATM machine, a peer to peer application, and the like, may act a client or a server based, in part, on their relationship to each other.

The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed towards a method and system for authenticating a client employing an infrastructureless certificate. The present invention is further directed towards storing of the certificate received through a trusted mechanism, and authenticating the client, when another certificate is received that is substantially the same as the stored certificate. The stored certificate and the received certificate may be substantially the same, when all parameters of the certificates that are compared, are the same. The certificates may have other parameters, that are not the same, but are not compared.

In commonly used secure session protocols, such as SSL/TSL, a server authenticates a client using certificates generated by a trusted source, such as a third party CA. When the server is provided the certificate by the client, it may validate a chain of certificates, usually through a number of third party CAs. This invention renders the chain validation process unnecessary by establishing a trusted relationship between the server and the client. This may be achieved by storing a certificate provided prior to establishing a secure session, through a trusted mechanism. The trusted mechanism may be manual entry of the certificate at the server, a secure channel, a private channel, and the like. Because the stored certificate is already trusted by the server, further validation of the certificate through a third party CA is not required. Furthermore, the certificate may be generated by a number of sources. The client may generate the certificate itself. The client may use an independent third party CA to generate the certificate for the client. The certificate may even be generated by the server that performs the authentication of the client.

Illustrative Operating Environment

FIG. 1 illustrates one embodiment of network system 100, in which the present invention may be practiced. As will be described in more detail below, the present invention relates generally to authenticating a client. Network system 100 may include many more, or less, components than those shown, however, those shown are sufficient to disclose an illustrative environment for practicing the invention.

As shown in the figure, network system 100 includes Local Area Network/Wide Area Network (LAN/WAN) 106, and client 102 and server 104. Client 102 and server 104 are in communication over LAN/WAN 106.

LAN/WAN 106 is enabled to employ any form of computer readable media for communicating information from one electronic device to another. In addition, LAN/WAN 106 may include the Internet in addition to local area networks, wide area networks, direct channels, such as through a universal serial bus (USB) port, other forms of computer-readable media, and any combination thereof. On an interconnected set of LANs, including those based on differing architectures and protocols, a router acts as a link between LAN's, enabling messages to be sent from one to another. Also, communication links within LANs typically include twisted pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices may be remotely connected to either LANs or WANs via a modem and temporary telephone link. In essence LAN/WAN 106 may include any communication mechanism by which information may travel between network devices, such as client 102 and server 104.

Client 102 and server 104 are configured to communicate with each other employing infrastructureless certificate authentication, according to one embodiment of the present invention. In another embodiment, client 102 and server 104 may reside within LAN/WAN 106, and may be connected to other network devices.

Client 102 and server 104 may be configured to operate as a portable or desktop computer with network connection, a personal digital assistant (PDA), a gateway, a firewall, a network translation device, a server array controller, a proxy server and the like.

Moreover, although FIG. 1 illustrates a server/client relationship, the invention is not so limited. For example, client 102 and server 104 may be configured to operate in a peer-to-peer configuration, without departing from the scope of the invention.

Figure 2:
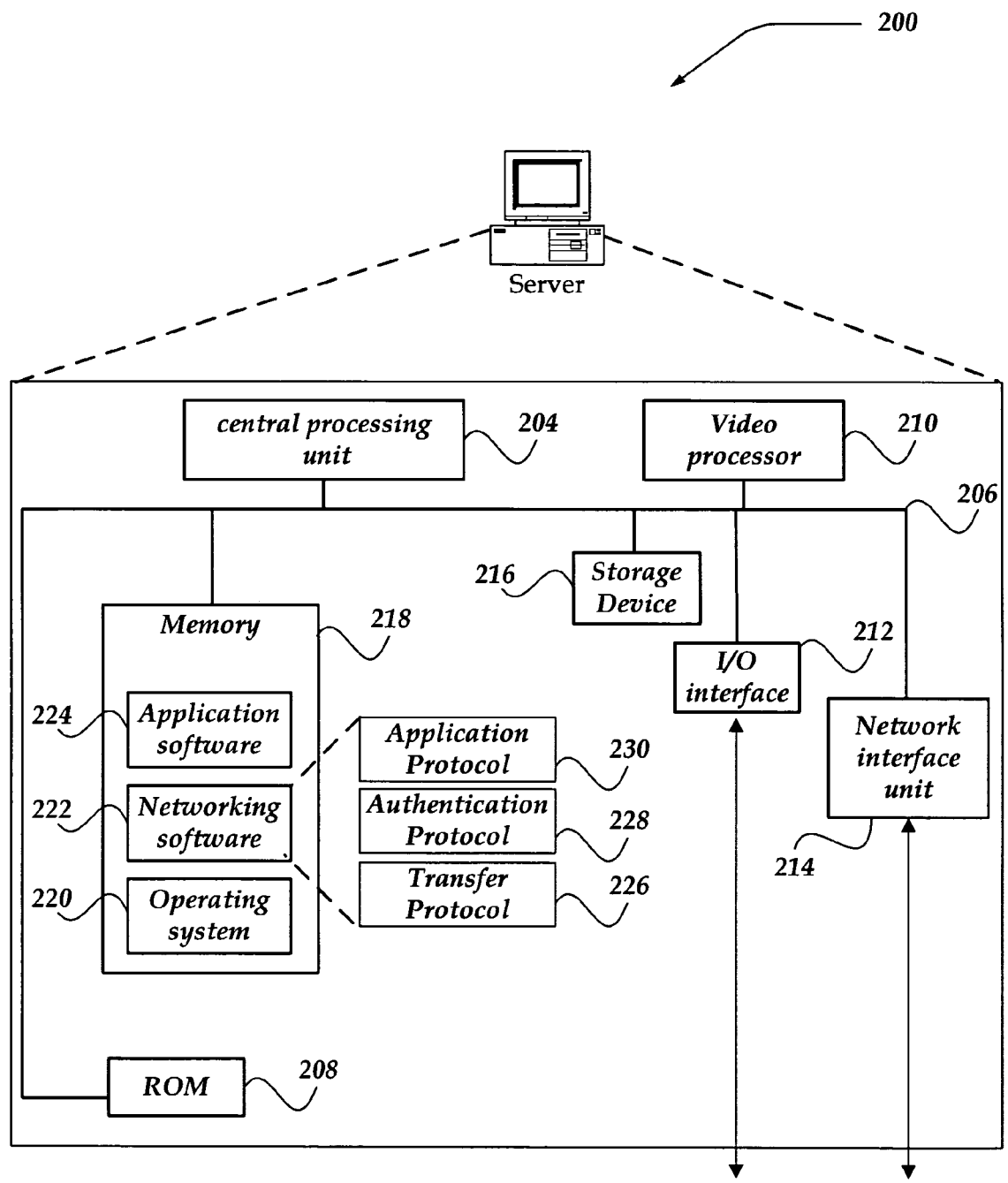
FIG. 2 illustrates a functional block diagram of one embodiment of a network device that may be employed to perform the invention.

FIG. 2 illustrates a functional block diagram of one embodiment of a server 200 in which the present invention may be practiced. Server 200 provides one embodiment for server 104 of FIG. 1. It will be appreciated that not all components of server 200 are illustrated, and that server 200 may include more or less components than those shown in the figure. Server 200 may operate, for example, as a portable or desktop computer with network connection, a PDA, a firewall, a gateway, a traffic management device, a distributor, a server array controller, or a proxy server. The communications may take place over a network, such as LAN/WAN 106 in FIG. 1, the Internet, or some other communications network.

As illustrated in FIG. 2, server 200 includes central processing unit (CPU) 204, video processor 210, read only memory (ROM) 208, memory 218, storage device 216, input/output interface (I/O) 212, and a network interface unit 214 interconnected via a bus 206.

In one embodiment, memory 218 stores program code for application software 224 and networking software 222 for performing networking functions of server 200. Networking software 222 may also include protocols that are employed to manage network communications, and the like. Such protocols may comprise transfer protocol 226, authentication protocol 228, and application protocol 230.

Transfer protocol 226 may include Transport Communication Protocol/Internet Protocol (TCP/IP), User Datagram Protocol/Internet Protocol (UDP/IP), and the like, that govern transporting and routing of data over the network. Authentication protocol 228 may include standard or proprietary secure communication protocols such as SSL/TSL, and the like. Application protocol 230 may include Hypertext Transport Protocol (HTTP), Lightweight Directory Access Protocol (LDAP), Internet Messaging Access Protocol (IMAP), and the like. These protocols may support typical application tasks such as displaying web pages or running email servers, and the like.

Memory 218 generally includes random access memory (RAM), and is interconnected with ROM 208 and one or more permanent mass storage devices, such as storage device 216. The mass memory stores operating system 220 for controlling the operation of network device 200. The operating system 220 may comprise an operating system such as UNIX, LINUX/™, Windows™, and the like.

Memory 218, ROM 208 and storage device 216 are computer storage media, which may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network interface unit 214 is constructed for use with various communication protocols including the TCP/IP and UDP/IP protocol. Network interface unit 214 may include or interface with circuitry and components for transmitting packets, and the like, over a wired and/or wireless communications medium. Network interface unit 214 is sometimes referred to as a transceiver, Network Interface Card (NIC), and the like.

Server 200 may also include an I/O interface 212 for communicating with external devices or users.

General Operation

Figure 3:
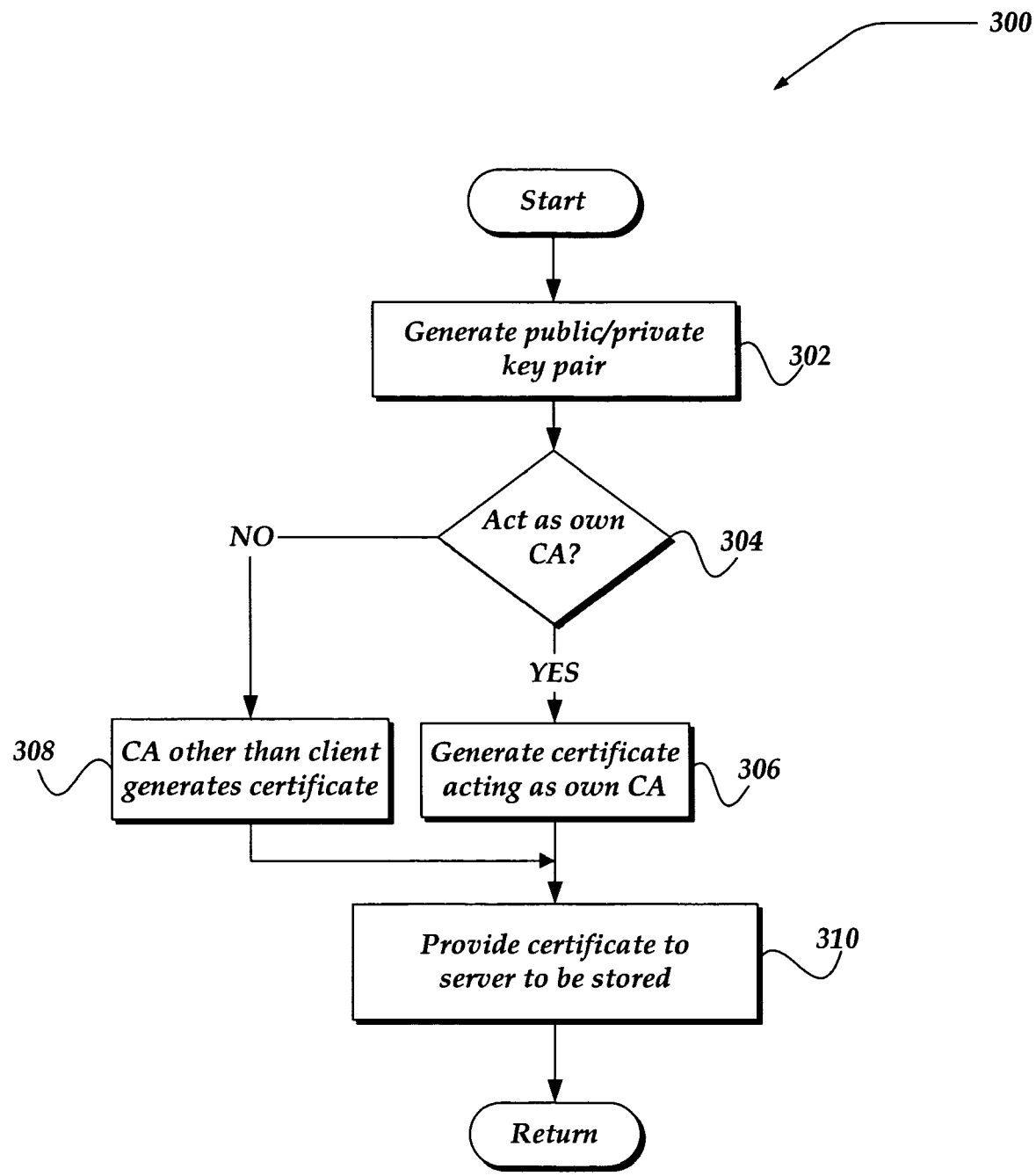
FIG. 3 illustrates a flow diagram generally showing one embodiment of a process for generating and sending a certificate by the client to be stored.

FIG. 3 illustrates a flow diagram generally showing one embodiment of a process for generating and sending a certificate by the client to be stored as part of the authentication in accordance with the present invention. Process 300 may, for example, operate within client 102 of FIG. 1.

As shown in FIG. 3, storing process 300 begins, after a start block, at block 302, where the client generates a public/private key pair.

Processing proceeds to decision block 304, where a determination is made whether the client will act as a CA in generating a certificate based on the public/private key pair or whether another CA will be used. If it is determined that the client will act as a CA, processing branches to block 306; otherwise, processing branches to block 308.

At block 306, the client generates the certificate based on the public/private key pair. The certificate generated at block 306 may include a date range of validity, identification of the issuing client, a digital signature from the public key generated by the client, domain name of the client, and the like. Upon completion of block 306, processing continues to block 310.

If it is determined that the client will use another CA at block 304, the certificate is generated by that CA at block 308. The CA may be an independent third party CA, the authenticating server, and the like. The CA receives the public key from the client to generate the certificate. The certificate generated at block 308 may include a date range of validity, identification of the CA, a digital signature from the public key generated by the client, domain name of the CA, verification that the issuing CA is a trusted CA, and the like. The generated certificate with the public key is then provided to the client. Upon completion of block 308, process 300 proceeds to block 310.

At block 310, the certificate is provided by the client to a server through a trusted mechanism. The trusted mechanism may include any of a variety of mechanisms, including, but not limited to, manual entry of the certificate at the server, a secure channel, a private channel, and the like. The trusted mechanism may further include authentication of the client to the server, proof of the client's ownership of the certificate, and the like. The client may prove ownership of the certificate by providing a digital signature, an encryption key, and the like. The trusted mechanism need not be over the same network where the network device and the authorizing network device communicate. Upon completion of block 310, process 300 returns to a calling process to perform other actions.

Figure 4:
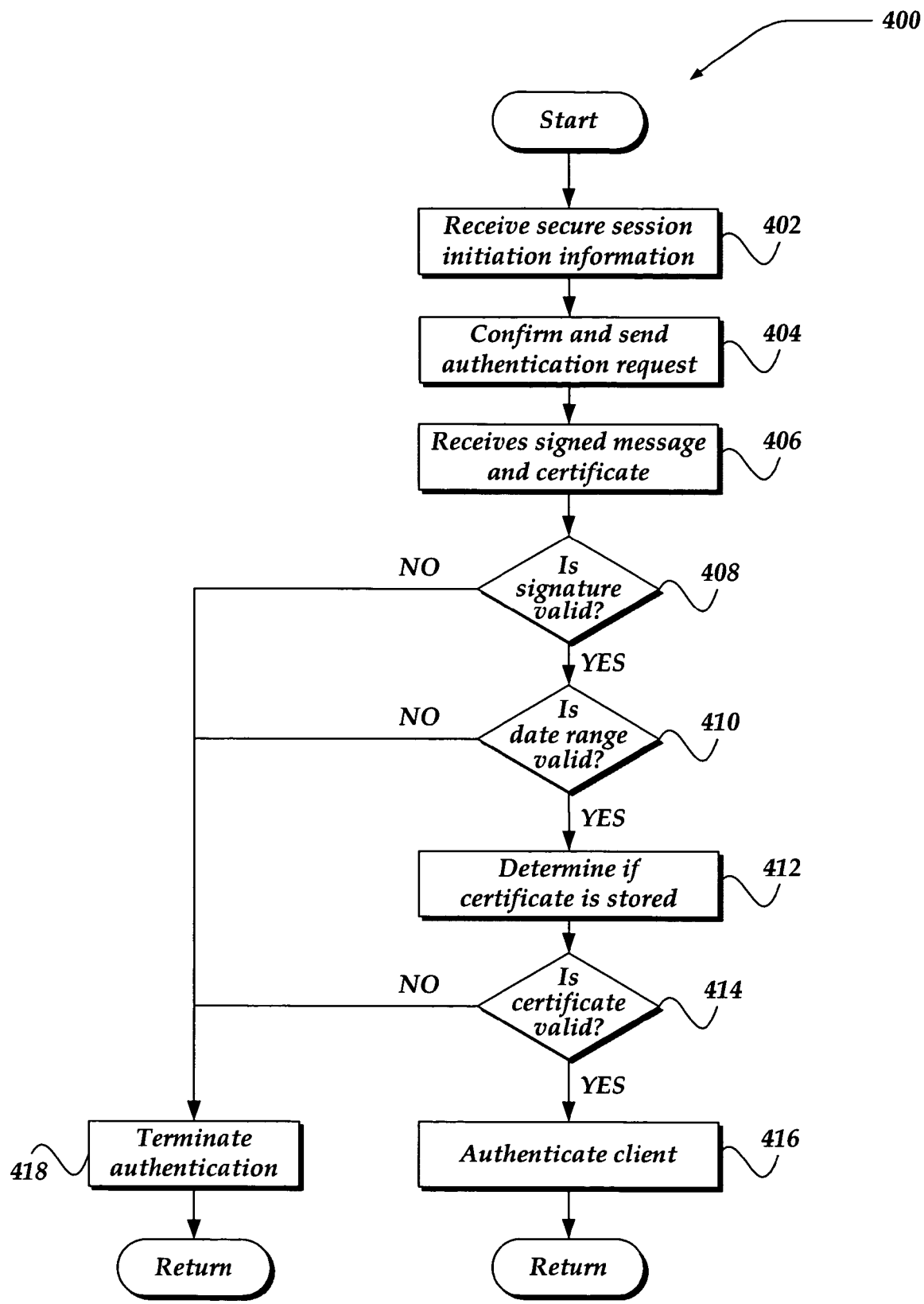
FIG. 4 illustrates a flow diagram generally showing one embodiment of a process for authenticating a client.

FIG. 4 illustrates a flow diagram generally showing one embodiment of a process for authenticating a client in accordance with the present invention. Process 400 may, for example, operate within server 104 of FIG. 1.

As shown in FIG. 4, authenticating process 400 begins, after a start block, at block 402, where information is received to initiate a secure session. Such information may include, but is not limited to, the client's SSL information, cipher settings, random data, and the like.

Processing proceeds to block 404, where the received information is confirmed by the server. The server's own secure session information, including, but not limited to, its SSL version, cipher settings, and random data is conveyed to the client. If the client is to authenticate the server, the server's certificate is transmitted to the client along with a request for the client's certificate. In one embodiment the client may authenticate the server prior to sending its certificate to the server. The server also sends an authentication request to the client asking for the client's certificate.

Upon completion of block 404, processing proceeds to block 406, where a pre-master secret signed with the client's digital signature is received. The pre-master secret may also be encrypted with the client's public key. The client's certificate conveyed at block 406 may include a date range of validity, identification of the issuing CA, the client's digital signature, domain name of the client, and the like.

Processing then proceeds to a number of decision blocks, where preliminary determinations are made as to the validity of a parameter of the secure session provided by the client. Decision block 408 determines whether the digital signature is valid. If the signature is valid, processing proceeds to decision block 410. If the signature is not valid, processing branches to block 418, where authentication attempt is terminated and client notified. Decision block 410 determines whether the date range of validity of the certificate has expired. If the date range of validity is current, processing proceeds to block 412. If the date range of validity has expired, processing branches to block 418, where authentication attempt is terminated and client notified. Process 400 may include additional decision blocks following, prior to, or between decision blocks 408 and 410 determining the validity of other information provided by the client.

Affirmative results of preliminary decision blocks 408 and 410 lead to block 412. At block 412, the server compares the client's certificate to the stored certificate at the server. The result of the comparison at block 412 leads to decision block 414.

At block 414, if the server determines the certificate and the stored certificate are substantially the same, processing proceeds to block 416. If the certificate and the stored certificate are not substantially the same, processing branches to block 418, where authentication attempt is terminated and client notified.

At block 416, the authentication of the client is completed. In one embodiment, the authentication may be followed by authorization of the client, where the server grants access to a resource over the network. The resource over the network may be pages of a web server, a database, a group of input/output (I/O) devices, and the like. Upon completing block 416, process 400 returns to a calling process.

It will be understood that each block of the flowchart illustration, and combinations of blocks in the flowchart illustration of FIGS. 3 and 4, may be implemented by a combination of hardware-based systems and software instructions. While the processes above are described referring to the embodiments of a client and a server, the processes apply to any network device to be authenticated. Examples of other particular embodiments include, a portable or desktop computer with network connection, a personal digital assistant (PDA), a firewall, a gateway, a traffic management device, a distributor, a server array controller, a proxy server, and the like. The software instructions may be executed by a processor to cause a series of operational steps to be performed by the processor to produce a computer implemented process such that the instructions, which execute on the processor, provide steps for implementing some or all of the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 5:
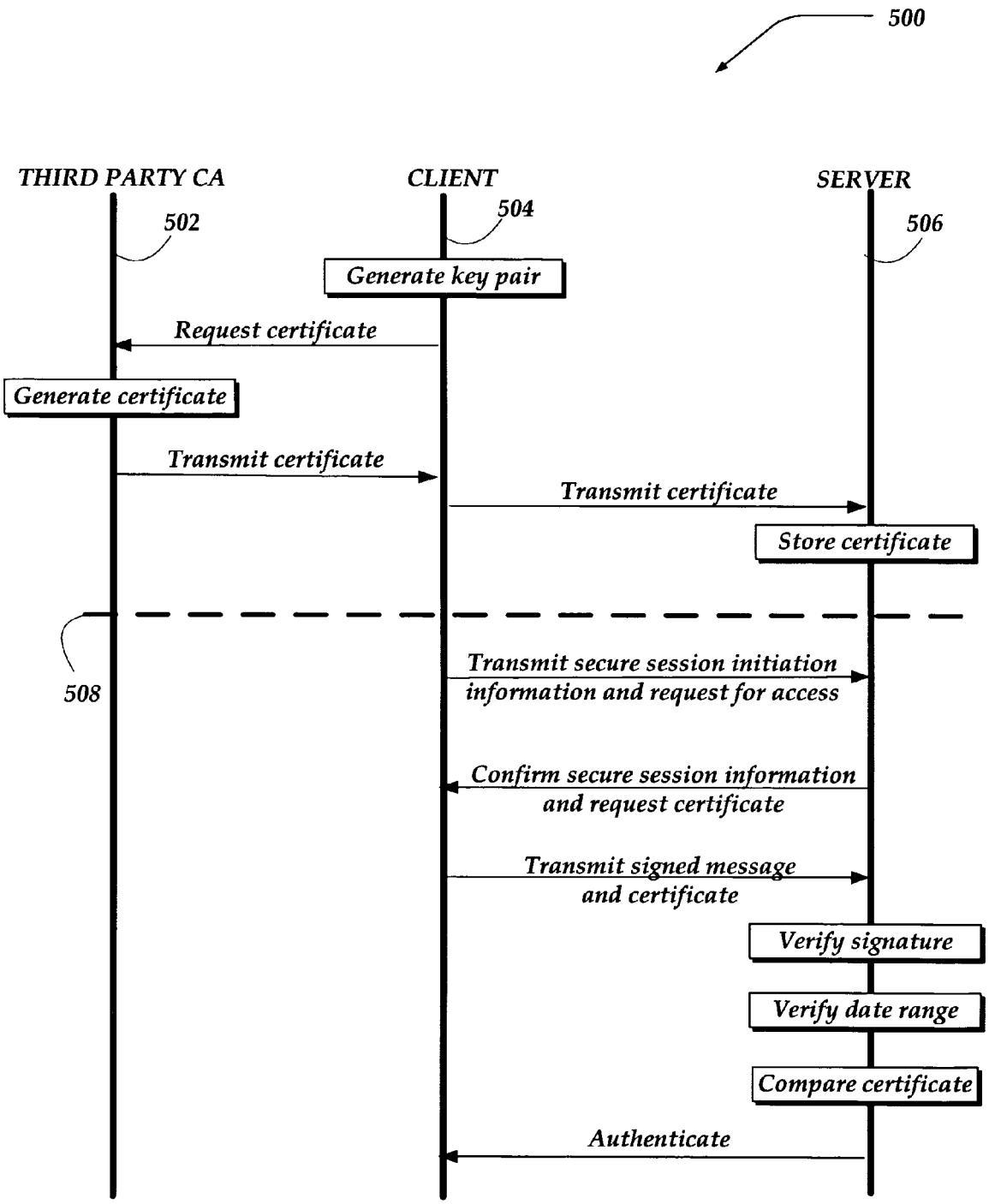
FIG. 5 illustrates message flows involved in one embodiment of the present invention.

FIG. 5 illustrates one embodiment of a message flow diagram for the system shown in FIG. 1, where a third party CA is employed to generate the certificate. As shown in the diagram, packet flow 500 includes third party CA 502, client 504, and server 506 across the top. Client 504 and server 506 may operate substantially similar to client 102 and server 104, respectively, of FIG. 1. Time may be viewed as flowing downward in the figure.

As shown in FIG. 5, the message flows are divided into two groups separated by timeline 508. The first group comprises message flows involved in storing a certificate. This process may be repeated, if client 504 desires to store a certificate with a new server, the stored certificate is no longer valid for any of a variety of reasons, and the like. The storing process begins with client 504 generating a public/private key pair. Client 504 sends a request for a certificate to third party CA 502 using its public key. Third party CA 502 generates the certificate for the client and transmits it to client 504. Client 504 in return transmits the certificate to server 506. Server 506 stores the certificate. Server 506 does not need to verify the certificate's authenticity by checking with third party CA 502 or any other trusted source. The transmission of the certificate from client 504 to server 506 typically takes place through a trusted mechanism. The trusted mechanism may include manual entry of the certificate at server 506, a secure channel, a private channel, and the like.

The authentication process, as shown below timeline 508, in FIG. 5, transpires between client 504 and server 506 over a network. The process is typically started by receiving of secure session initiation information and a request for authentication over the network by server 506. This process may be repeated as many times as client 504 desires authentication.

Upon receiving a secure session initiation message from client 504, server 506 responds with confirmation of secure session information. This may include server 506's own SSL version, cipher settings, and random data. Server 506 also sends a request for the certificate of client 504.

Client 504 transmits back to server 506 a pre-master secret signed with client 504's digital signature and the certificate.

Server 506 goes through a number of validation steps including, but not limited to, verifying client 504's digital signature, verifying validity of the certificate's date range, and the like. Finally, server 506 compares the certificate to the stored certificate at server 506. If the certificate is substantially the same as the stored certificate, secure session is established and server 506 authenticates client 504.

Figure 6:
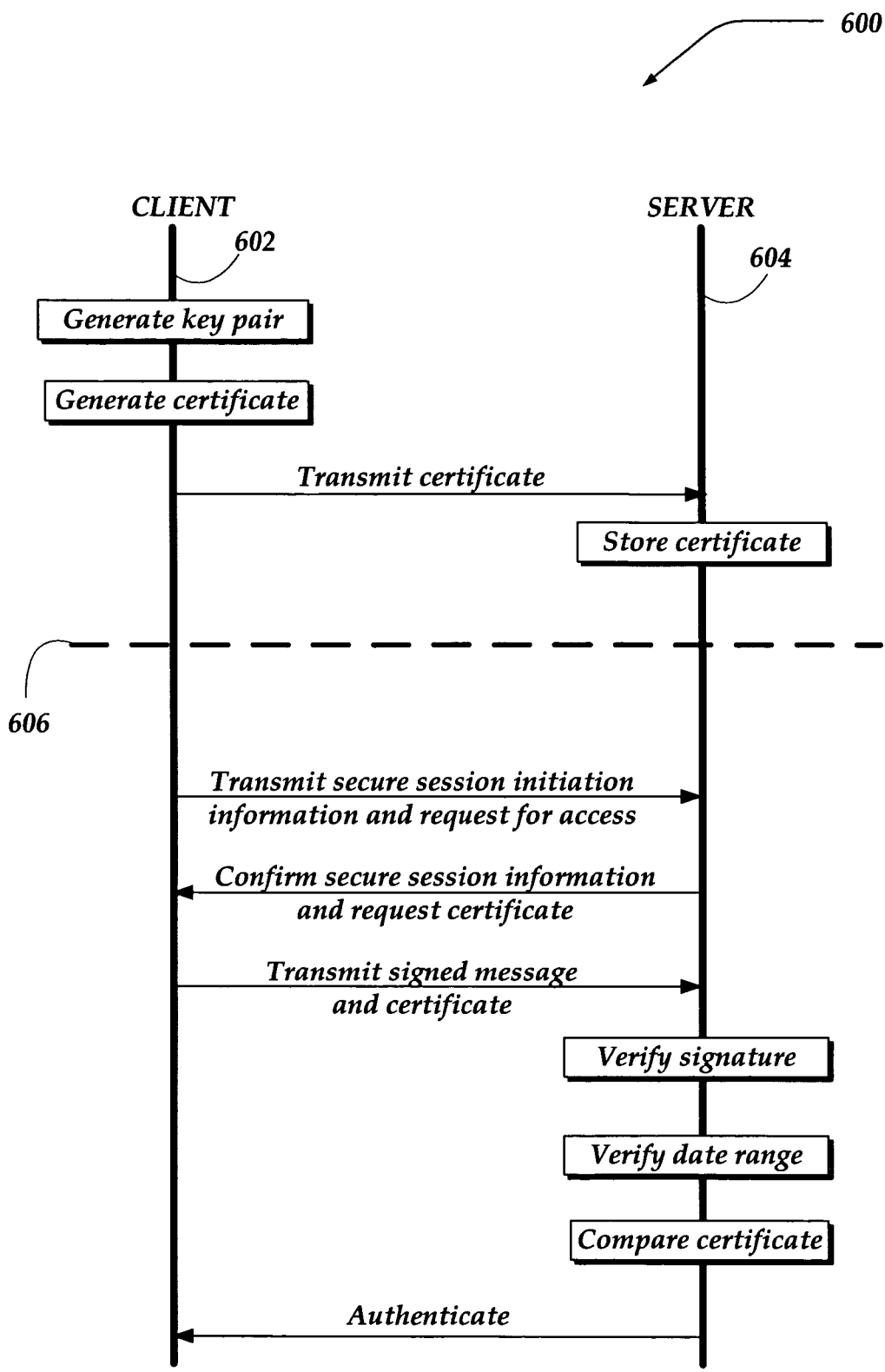
FIG. 6 illustrates another embodiment of message flows, in accordance with the present invention.

FIG. 6 illustrates another embodiment of a message flow diagram for the system shown in FIG. 1, where the client acts as a CA itself to generate the certificate. As shown in the diagram, packet flow 600 includes client 602 and server 604 across the top. Time may be viewed as flowing downward in the figure.

As illustrated in FIG. 6, the message flows are again divided into two groups separated by timeline 606. The first group comprises message flows involved in storing the certificate. This process may be repeated, if client 602 desires to store the certificate with a new server, or the stored certificate is no longer valid for any of a variety of reasons. The storing process begins with client 602 generating a public/private key pair and the certificate based, in part, on the public/private key pair. Client 602 then transmits the certificate to server 604. Server 604 stores the certificate. The transmission of the certificate from client 602 to server 604 typically takes place through a trusted mechanism. The trusted mechanism may include manual entry of the certificate at server 604, a secure channel, a private channel, and the like.

The authentication process, as shown below timeline 606, in FIG. 6, transpires between client 602 and server 604 over a network, and is substantially similar to the authentication process described in FIG. 5, below timeline 508.

It will be understood that each element of the message flow illustration, and combinations of elements in the message flow illustration of FIGS. 5 and 6, may be implemented by a combination of hardware-based systems and software instructions. While the message flows above are described referring to the embodiments of a client and a server, the message flows apply to any network device to be authenticated. Examples of other particular embodiments include, a portable or desktop computer with network connection, a personal digital assistant (PDA), a firewall, a gateway, a traffic management device, a distributor, a server array controller, a proxy server, and the like. The software instructions may be executed by a processor to cause a series of operational steps to be performed by the processor to produce a computer implemented process such that the instructions, which execute on the processor, provide steps for implementing some or all of the actions specified in the message flow elements.

Accordingly, elements of the message flow illustration support combinations of means for performing the specified actions, combinations of steps for performing the specified actions and program instruction means for performing the specified actions. It will also be understood that each element of the message flow illustration, and combinations of elements in the message flow illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method for authenticating a client over a network, comprising: generating a first certificate; sending the first certificate to a server, wherein the server is configured to store the first certificate; requesting a second certificate if authentication over the network is requested; sending the second certificate to the server over the network; comparing the second certificate to the first certificate at the server, and if the second certificate and the first certificate are substantially the same, authenticating the client.

2. The method of claim 1, wherein the server is further configured to generate the first certificate.

3. The method of claim 1, wherein sending the first certificate further comprises using a trusted mechanism selected from at least one of a manual entry of certificate, a secure channel, and a private channel.

4. The method of claim 3, wherein the trusted mechanism further comprises at least one of the client authenticating to the server, and the client proving ownership of the certificate to the server.

5. The method of claim 1, wherein the client is further configured to generate the first certificate.

6. The method of claim 1, wherein a third party Certificate Authority (CA) is configured to generate the first certificate.

7. A method for authenticating a client over a network, comprising: receiving a certificate from the client over a trusted mechanism; storing the certificate at a server; requesting another certificate if authentication is requested; comparing the other certificate to the stored certificate, and if the other certificate and the stored certificate are substantially the same, authenticating the client.

8. The method of claim 7, wherein the trusted mechanism further comprises at least one of a manual entry of certificate, a secure channel, and a private channel.

9. The method of claim 8, wherein the trusted mechanism further comprises at least one of the client authenticating to the server, and the client proving ownership of the certificate to the server.

10. The method of claim 7, wherein the server is further configured to store and to compare the certificate.

11. The method of claim 7, wherein the certificate is stored in at least one of a hard disk, a tape disk, and a mass storage device.

12. A method for authenticating a network device over a network, comprising: generating a certificate; sending the certificate to an other network device, wherein the other network device enables storage of the certificate; resending the certificate to the other network device; comparing the resent certificate to the stored certificate; and if the resent certificate and the stored certificate are determined to be substantially the same, receiving authentication.

13. The method of claim 12, wherein generating the certificate is performed by the other network device.

14. The method of claim 12, wherein the network device is configured to generate the first certificate.

15. The method of claim 12, wherein a third party Certificate Authority (CA) is configured to generate the first certificate.

16. An apparatus for authenticating a client over a network, comprising: a first component configured to receive a first certificate and a second certificate; and a second component, coupled to the first component, that is configured to perform actions including: determining if the first certificate and the second certificate are substantially the same; and if it is determined that the first certificate and the second certificate are substantially the same, authenticating the client associated with the first certificate and the second certificate.

17. The apparatus of claim 16, wherein the apparatus operates as at least one of a server, a gateway, and a server array.

18. The apparatus of claim 16, wherein the first component is further configured to store the first certificate.

19. The apparatus of claim 16 further comprising a third component, coupled to the first component, and configured to generate the first certificate based, in part, on information provided by the client.

20. An apparatus for receiving authentication over a network, comprising: a first component configured to generate a certificate; a second component, coupled to the first component, configured to send the certificate to a server; and a third component, coupled to the second component, configured to resend the certificate to the server over the network, wherein resending the certificate enables the server to authenticate a client based, in part, on a comparison of the sent certificate and the resent certificate to determine if the sent certificate and the resent certificate are substantially the same.

21. The apparatus of claim 20, wherein the apparatus operates as at least one of a client, a portable computer, and a personal digital assistant.

22. The apparatus of claim 20, wherein the certificate is sent to the server using a trusted mechanism selected from at least one of a manual entry of certificate, a secure channel, and a private channel.

23. The apparatus of claim 22, wherein the trusted mechanism further comprises at least one of the client authenticating to the server, and the client proving ownership of the certificate to the server.

24. A system for authenticating a client over a network, comprising: a client, configured to perform actions, comprising: generating a first certificate; sending the first certificate to a server to be stored; and sending a second certificate if authentication over the network is requested; and a server, in communication with the client, configured to perform actions, comprising: storing the first certificate at the server if the first certificate is received for a first time; comparing the second certificate to the first certificate; and authenticating the client over the network, if the first certificate and the second certificate are substantially the same.

25. The system of claim 24, wherein authenticating the client over the network further comprises establishing a secure session.

26. A system for authenticating a client over a network, comprising: a client, further comprising: means for generating a first certificate; means for sending the first certificate to a server to be stored; and means for sending a second certificate if authentication over the network is requested; and a server, in communication with the client, further comprising: means for storing the first certificate at the server if the first certificate is received for the first time; means for comparing the second certificate to the first certificate; and means for authenticating the client, if the first certificate and the second certificate are substantially the same.

27. The system of claim 26, wherein the means for storing comprises at least one of a hard disk, a tape disk, and a mass storage device.

\* \* \* \* \*